US008958092B2

(12) United States Patent
Uchikawa (10) Patent No.: US 8,958,092 B2
(45) Date of Patent: Feb. 17, 2015

(54) IMAGE PROCESSING APPARATUS, CONTROL METHOD FOR IMAGE PROCESSING APPARATUS AND STORAGE MEDIUM FOR RECEIVING AN ELECTRONIC DOCUMENT FROM AN EXTERNAL APPARATUS ACCORDING TO A PLURALITY OF RECEPTION METHODS

(75) Inventor: Hiroshi Uchikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/588,897

(22) Filed: Aug. 17, 2012

(65) Prior Publication Data

US 2013/0050738 A1  Feb. 28, 2013

(30) Foreign Application Priority Data

Aug. 22, 2011 (JP) ................. 2011-180585

(51) Int. Cl.
*G06K 15/02* (2006.01)
*H04N 1/44* (2006.01)
*H04N 1/32* (2006.01)

(52) U.S. Cl.
CPC ........... *H04N 1/444* (2013.01); *H04N 1/32101* (2013.01); *H04N 1/32358* (2013.01); *H04N 2201/3273* (2013.01); *H04N 2201/3242* (2013.01); *H04N 2201/0094* (2013.01); *H04N 2201/3274* (2013.01)
USPC ......... 358/1.14; 358/1.15; 358/1.16; 358/403

(58) Field of Classification Search
CPC .............. G06K 15/02; H04N 1/32101; H04N 1/32358; H04N 1/444; H04N 2201/3273; H04N 2201/3274; H04N 2201/3242; H04N 2201/0094
USPC .............. 358/1.1, 1.13, 1.14, 1.15, 1.16, 400, 358/401, 402, 403
See application file for complete search history.

(56) References Cited

U.S. PATENT DOCUMENTS

| 7,033,091 B2 * | 4/2006 | Nakao ............................. 400/76 |
| 2004/0213615 A1 | 10/2004 | Nakao |
| 2007/0234399 A1 | 10/2007 | Yamazaki |
| 2009/0002747 A1 | 1/2009 | Ebitani |

FOREIGN PATENT DOCUMENTS

| EP | 2285087 A1 | 2/2011 |
| JP | 2007-108883 A | 4/2007 |

* cited by examiner

*Primary Examiner* — Thomas D Lee
(74) *Attorney, Agent, or Firm* — Canon U.S.A., Inc. IP Division

(57) ABSTRACT

An image processing apparatus registers permission or prohibition of RETRANSMISSION/REPRINT in a reception rule registration unit for each reception condition, determines whether RETRANSMISSION/REPRINT is permitted based on a reception method that the image processing apparatus uses to receive an electronic document from an external apparatus, and retransmits/reprints the electronic document from a reception history based on the result of the determination.

13 Claims, 10 Drawing Sheets

RECEPTION CONDITION

RECEPTION METHOD  FACSIMILE

RETRANSMISSION/REPRINT  PERMITTED

RECEPTION METHOD  ELECTRONIC MAIL

RETRANSMISSION/REPRINT  PROHIBITED

CLOSE

| RULE ID | NAME OF RULE | RECEPTION METHOD | COMPARISON ATTRIBUTE | COMPARISON VALUE | EQUATION | RETRANSMISSION/REPRINT IS PERMITTED FOR |
|---|---|---|---|---|---|---|
| 1 | FACSIMILE AT HEAD OFFICE | FACSIMILE | TELEPHONE NUMBER OF TRANSMISSION SOURCE | 12345689 | SAME AS THIS VALUE | MANAGER 1, MANAGER 2 |
| 2 | ELECTRONIC MAIL AT HEAD OFFICE | ELECTRONIC MAIL | ADDRESS OF TRANSMISSION SOURCE | honsya@aaa.com | SAME AS THIS VALUE | MANAGER 1, MANAGER 2 |
| 3 | CUSTOMER 1 | FACSIMILE | TELEPHONE NUMBER OF TRANSMISSION SOURCE | 987654321 | SAME AS THIS VALUE | SALES 1 |
| 4 | CUSTOMER 2 | ELECTRONIC MAIL | ADDRESS OF TRANSMISSION SOURCE | user@zzz.com | SAME AS THIS VALUE | |
| 5 | BRANCH OFFICE 1 | ELECTRONIC MAIL | ADDRESS OF TRANSMISSION SOURCE | @aaa.com | ENDS WITH THIS VALUE | * |
| 6 | BRANCH OFFICE 2 | ELECTRONIC MAIL | ADDRESS OF TRANSMISSION SOURCE | @aaa.com | ENDS WITH THIS VALUE | * |

FIG.9 ically illustrates an overall configuration of a system including an image processing apparatus of embodiments of the present invention.

IMAGE PROCESSING APPARATUS, CONTROL METHOD FOR IMAGE PROCESSING APPARATUS AND STORAGE MEDIUM FOR RECEIVING AN ELECTRONIC DOCUMENT FROM AN EXTERNAL APPARATUS ACCORDING TO A PLURALITY OF RECEPTION METHODS

BACKGROUND OF THE INVENTION

1. Field of the Invention

The present invention relates to an image processing apparatus that performs a predetermined operation on an electronic document received from an external apparatus.

2. Description of the Related Art

In recent years, some image forming apparatuses such as multifunction peripherals are provided with a mass-storage hard disk, and have a function of storing an electronic document or a job setting of a print job or a transmission job performed once to facilitate retransmission or reprint thereof.

According to this function, not only can a user easily retransmit an electronic document transmitted once, but also, if the electronic document transmitted once does not meet a desired image quality or file format, the user can retransmit it just by changing the setting without scanning the document again. Further, according to this function, not only can the user easily reprint an electronic document printed once, but also, if the electronic document printed once does not meet a desired output result, the user can reprint the document with a part of the job setting (for example, the number of print or a print layout) changed.

On the other hand, conventionally, the multifunction peripherals have a function of receiving an electronic document from an external apparatus by a reception method such as facsimile or electronic mail via a network or a public line. An electronic document received by facsimile may contain confidential information from a client or a business partner, whereby allowing the multifunction peripherals to limitlessly retransmit or reprint the electronic document is undesirable in terms of security.

For solving this problem, Japanese Patent Application Laid-Open No. 2007-108883 discusses a method of preparing a policy server for managing access to an electronic document, embedding this policy into the electronic document, and setting a limitation according to the policy.

According to the method discussed in Japanese Patent Application Laid-Open No. 2007-108883, although it is possible to permit or prohibit access to the received electronic document, it is impossible to prevent the received document from being transmitted. Further, it is impossible to switch a permission or a prohibition for a reprint with use of a job setting of a job performed once.

SUMMARY OF THE INVENTION

The present invention is directed to a multifunction peripheral provided with a retransmission/reprint function, which can easily limit retransmission/reprint of a received electronic document.

According to an aspect of the present invention, an image processing apparatus, which is capable of receiving an electronic document from an external apparatus according to a plurality of reception methods, includes a registration unit configured to register a reuse permission setting, which indicates permission of reuse of the electronic document, so as to correspond to at least one of the plurality of reception methods, a processing unit configured to perform predetermined processing on the electronic document received from the external apparatus according to one of the plurality of reception methods, a storage unit configured to store the electronic document received according to the reception method corresponding to the registered reuse permission setting by associating the electronic document with a history of the predetermined processing performed by the processing unit, a display unit configured to display the history of the predetermined processing performed by the processing unit, and a reuse unit configured to reuse the electronic document identified from the history displayed by the display unit.

According to another aspect of the present invention, an image processing apparatus, which is capable of receiving an electronic document from an external apparatus according to a plurality of reception methods, includes a processing unit configured to perform predetermined processing on the electronic document received from the external apparatus according to one of the plurality of reception methods, a storage unit configured to store the received electronic document by associating the electronic document with a history of the predetermined processing performed by the processing unit, a display unit configured to display the history of the predetermined processing performed by the processing unit, a reuse unit configured to reuse the electronic document identified from the history displayed by the display unit, a registration unit configured to register a reuse permission setting, which indicates permission of reuse of the electronic document, so as to correspond to at least one of the plurality of reception methods, and a control unit configured to permit the reuse unit to reuse the electronic document received according to the reception method corresponding to the reuse permission setting, and to limit that the reuse unit reuses the electronic document received according to the reception method that does not correspond to the reuse permission setting.

These aspects of the present invention enable the image processing apparatus provided with the retransmission/reprint function to easily limit retransmission/reprint of the received electronic document.

Further features and aspects of the present invention will become apparent from the following detailed description of embodiments with reference to the attached drawings.

BRIEF DESCRIPTION OF THE DRAWINGS

The accompanying drawings, which are incorporated in and constitute a part of the specification, illustrate embodiments, features, and aspects of the invention and, together with the description, serve to explain the principles of the invention.

DESCRIPTION OF THE EMBODIMENTS

Various embodiments, features, and aspects of the invention will be described in detail below with reference to the drawings.

Figure 1:
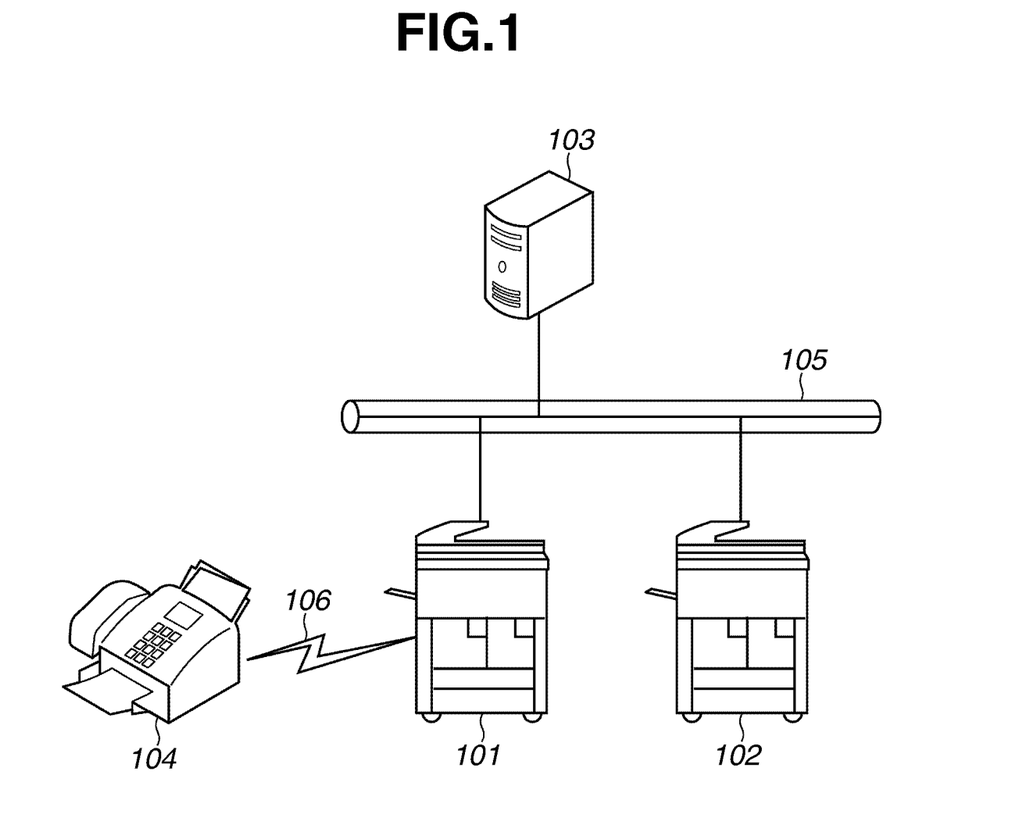
FIG. 1 schematically illustrates an overall configuration of a system including an image processing apparatus of embodiments of the present invention.

FIG. 1 schematically illustrates an overall configuration of a system including an image processing apparatus according to embodiments of the present invention.

In this system, image processing apparatuses 101 and 102 are connected to a personal computer (PC) 103 as a mail server via a network 105. Further, the image processing apparatus 101 is configured to be communicable with a facsimile apparatus 104 via a public line 106.

The image processing apparatus 101 is a multifunctional copying machine. The image processing apparatus 101 has not only a function of copying a sheet document, but also functions of printing print data transmitted from an external printer driver and of reading a sheet document to transmit that data to an external file server or a mail address (a TRANSMISSION function). Further, the image processing apparatus 101 has a function of transmitting data to the image processing apparatus 102, which is another image processing apparatus, to print that data by the image processing apparatus 102 at a transmission destination (a remote copy function and a facsimile function), and a function of receiving electronic mail from the PC 103, which will be described below, and a facsimile document from the facsimile apparatus 104.

The PC 103 is a computer provided as a mail server, and is a mail server that delivers electronic mail in response to an electronic mail acquisition request from the image processing apparatus 101 or transmits electronic mail from the PC 103 to the image processing apparatus 101.

The facsimile apparatus 104 is a communication apparatus having a function of transferring data according to, for example, the Group 3 (G3) protocol.

The image processing apparatus 101 is connected to the image processing apparatus 102 and the PC 103 via the Ethernet (registered trademark) network 105, and is connected to the facsimile apparatus 104 via a public line 106. In this way, the image processing apparatus 101 is connected via a plurality of different types of communication media.

Figure 2:
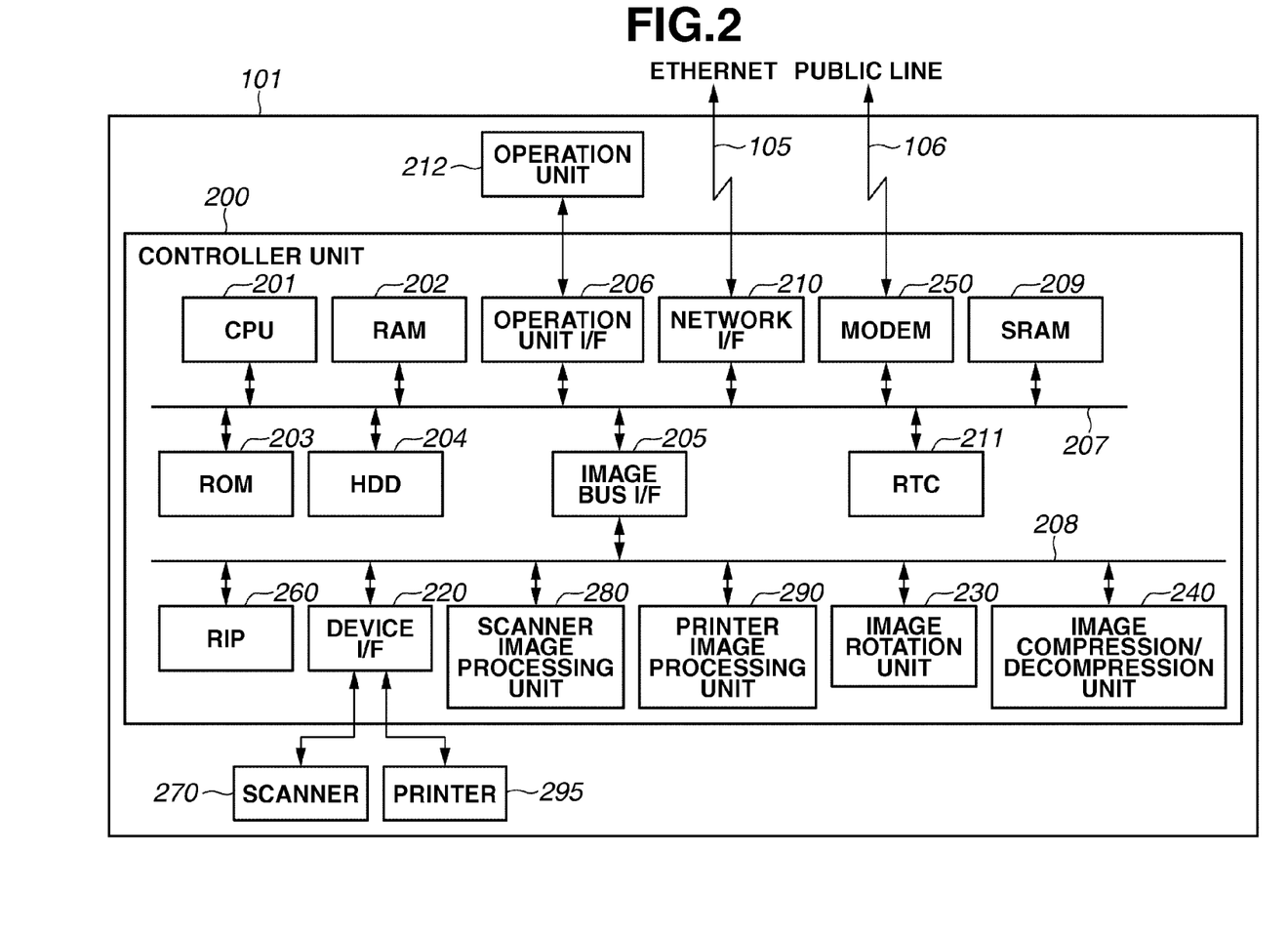
FIG. 2 is a block diagram illustrating a hardware configuration of the image processing apparatus illustrated in FIG. 1.

FIG. 2 is a block diagram illustrating a hardware configuration of the image processing apparatus 101 illustrated in FIG. 1.

A controller unit 200 is connected to a scanner 270, which is an image input device, and a printer 295, which is an image output device. On the other hand, the controller unit 200 inputs and outputs image information and device information by being connected to the Ethernet (registered trademark) network 105 and the public line 106.

A central processing unit (CPU) 201 is a controller that controls the image processing apparatus 101. A random access memory (RAM) 202 serves as a system work memory enabling the CPU 201 to operate, and also serves as an image memory for temporarily storing image data. A read only memory (ROM) 203 is a boot ROM, and stores a boot program of the system. A hard disk drive (HDD) 204 stores system software, an application, and image data.

An operation unit interface 206 is an interface unit for an operation unit 212 including a touch panel, and outputs image data to be displayed on the operation unit 212 to the operation unit 212. Further, the operation unit interface 206 serves to transfer information input by a user of the present system from the operation unit 212 to the CPU 201. A network interface 210 is connected to the network 105, and inputs/outputs information. A modem 250 is connected to the public line 106, and inputs/outputs information.

A static random access memory (SRAM) 209 is a non-volatile recording medium that can operate at a high speed. A real-time clock (RTC) 211 keeps counting the current time even when the controller unit 200 is turned off. These devices are disposed on a system bus 207.

An image bus interface 205 is a bus bridge that connects the system bus 207 and an image bus 208 capable of transferring image data at a high speed, and converts a data structure therebetween. The image bus 208 is constituted by a Peripheral Component Interconnect (PCI) bus or an Institute of Electrical and Electronic Engineers (IEEE) 1394 bus. The following devices are disposed on the image bus 208.

A raster image processor (RIP) 260 develops a Page Description Language (PDL) code into a bitmap image. A device interface 220 connects the scanner 270 and the printer 295, which are image input/output devices, with the controller unit 200, and converts image data synchronously or asynchronously. A scanner image processing unit 280 corrects, processes, and edits input image data. A printer image processing unit 290 performs, for example, a printer correction and resolution conversion on print output image data. An image rotation unit 230 rotates image data. An image compression/decompression unit 240 compresses and decompresses image data.

Figure 3:
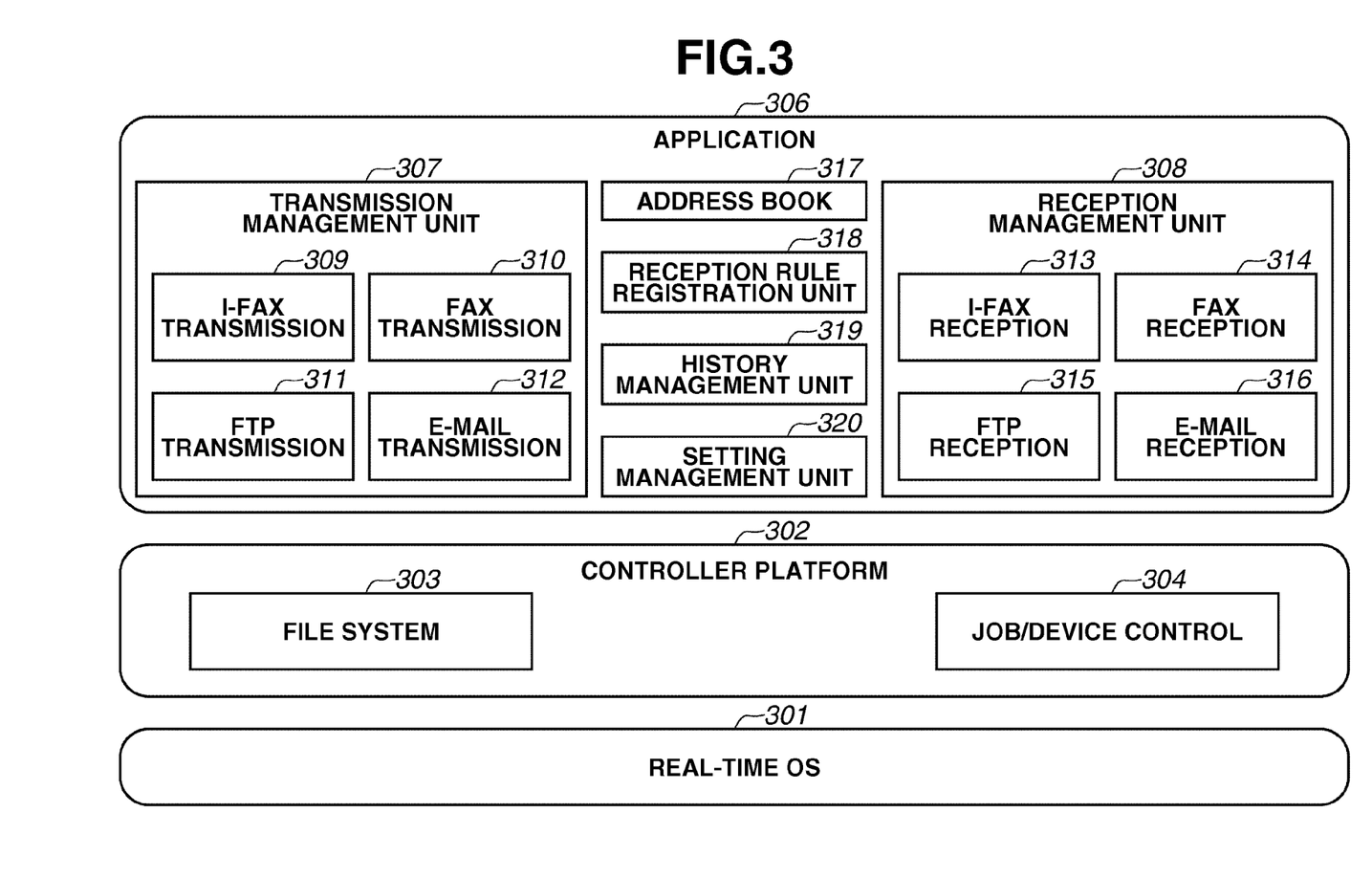
FIG. 3 is a block diagram illustrating a software configuration of the image processing apparatus illustrated in FIG. 1.

FIG. 3 is a block diagram illustrating a software configuration of the image processing apparatus 101 illustrated in FIG. 1.

This software is stored in the HDD 204 of the image processing apparatus 101 as firmware, and is read out to the RAM 202 to be executed by the CPU 201.

A real-time operating system (OS) 301 provides services and frameworks for managing various types of resources optimized for control of the built-in system, for the software running thereon.

The services and the frameworks for managing various types of resources provided by the real-time OS 301 include multitask (multithread) management, which allows a plurality of types of processing to be performed substantially in parallel by managing a plurality of contexts with respect to execution of processing by the CPU 201, and inter-task communication, which realizes synchronization and data exchanges between tasks. Further, the services and the frameworks include, for example, memory management, interrupt management, various types of device drivers, and a protocol stack implementing various types of protocol processing such as local interfacing, networking, and communication.

A controller platform 302 includes, for example, a file system 303 and a job/device control 304. The file system 303 is a system for storing data constructed on a storage apparatus such as the HDD 204 or the RAM 202. The job/device control 304 controls the hardware of the image processing apparatus 101, and controls a job that utilizes basic functions (for example, printing, scanning, communication, and image conversion) provided mainly by the hardware of the image processing apparatus 101.

An application 306 is a built-in application that utilizes a mechanism provided by the real-time OS 301 and the controller platform 302, and inputs/outputs an image or text data via the Ethernet (registered trademark) network 105 or the public line 106. The application 306 includes, as main mechanisms, a transmission management unit 307, which provides integrated management of transmission jobs, and a reception management unit 308, which provides integrated management of reception jobs.

The transmission management unit 307 includes Internet-facsimile (I-FAX) transmission 309, facsimile (FAX) transmission 310, file transfer protocol (FTP) transmission 311, and electronic mail (E-mail) transmission 312. The reception management unit 308 includes I-FAX reception 313, FAX reception 314, FTP reception 315, and E-mail reception 316. The transmission management unit 307 and the reception management unit 308 control various types of transmission and reception jobs. Further, the application 306 includes, for example, an address book 317 for managing mail addresses and Uniform Resource Locators (URLs) to be set as a transmission destination, a reception rule registration unit 318 for managing processing rules at the time of reception, a history management unit 319 for managing transmission/reception histories, and a setting management unit 320 for managing various types of setting information, as mechanisms that assist transmission and reception by the transmission management unit 307 and the reception management unit 308.

A method for limiting reuse of an electronic document according to a first embodiment will be described with reference to FIGS. 4 and 5. Electronic documents described in the present embodiment include document data (image data) transmitted and received via a facsimile line, electronic data transmitted and received via a network such as electronic mail, and other various types of electronic data.

Figure 4:
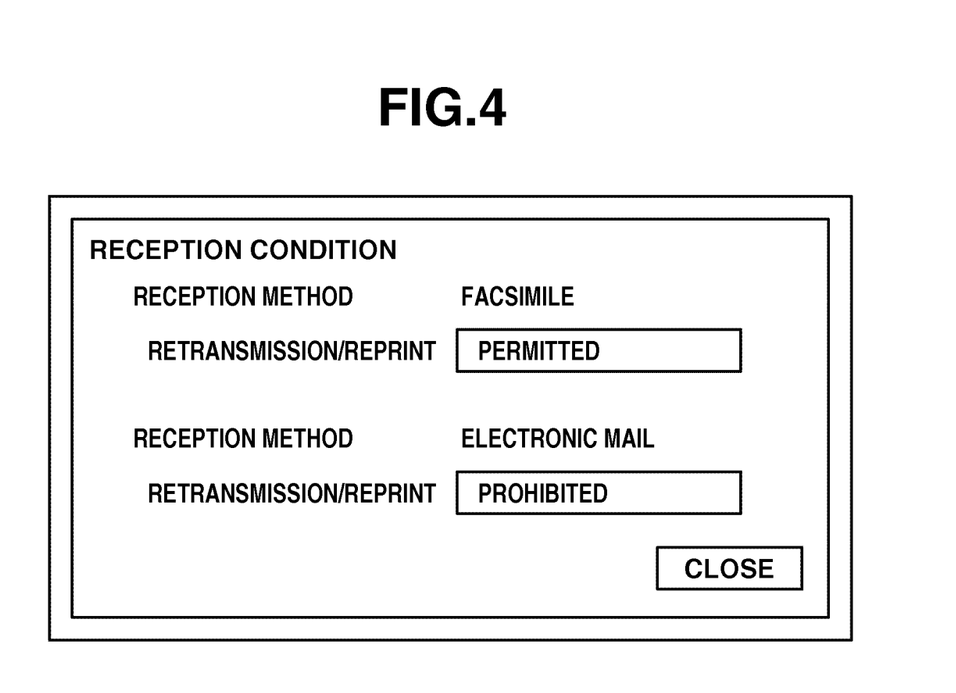
FIG. 4 is a setting screen where a user sets whether a received electronic document is stored for RETRANSMISSION/REPRINT for each reception method according to a first embodiment of the present invention.

FIG. 4 illustrates an example of a setting screen where the user sets whether the image processing apparatus 101 according to the first embodiment stores an electronic document received from an external apparatus in the HDD 204 for reuse, in such a manner that the setting corresponds to a reception method. The setting screen illustrated in FIG. 4 is displayed on the operation unit 212 of the image processing apparatus 101.

In the present embodiment, the term "reuse" is used to mean, after execution of a predetermined operation regarding a received electronic document (printing or transmitting the received electronic document), reprinting or retransmitting the electronic document. Hereinafter, the reuse is referred to as "RETRANSMISSION/REPRINT".

In the setting screen illustrated in FIG. 4, the image processing apparatus 101 is set so as to permit RETRANSMISSION/REPRINT of only electronic documents received via the facsimile line (facsimile data). According to this setting, for example, for an electronic document received from the facsimile apparatus 104 via the facsimile line, the setting (for example, resolution) when a predetermined operation is performed on the received electronic document, and the received electronic document are stored in the HDD 204 for RETRANSMISSION/REPRINT.

On the other hand, in the setting screen illustrated in FIG. 4, the image processing apparatus 101 is set to prohibit reuse of electronic documents (electronic mail data) received from the PC 103 via the Ethernet (registered trademark) network 105. More specifically, an electronic document received via the Ethernet (registered trademark) network 105 is deleted after execution of a predetermined operation regarding the electronic document, thereby prohibiting reuse of the electronic document.

In the setting screen illustrated in FIG. 4, facsimile and electronic mail are shown as examples of reception methods. If the image processing apparatus 101 includes a plurality of facsimile lines, the reusability may be set for each line such as a facsimile line 1 and a facsimile line 2.

Further, in the setting screen illustrated in FIG. 4, facsimile and electronic mail are shown as examples of reception methods, for each of which RETRANSMISSION/REPRINT is set to be permitted or prohibited. As other reception methods, for example, the image processing apparatus 101 may be configured in such a manner that whether RETRANSMISSION/REPRINT is permitted can be set according to what type of network communication protocol (for example, FTP, Web-based Distributed Authoring and Versioning (WebDav), and Server Message Block (SMB)) an electronic document is received through or which port an electronic document is received via.

Figure 5:
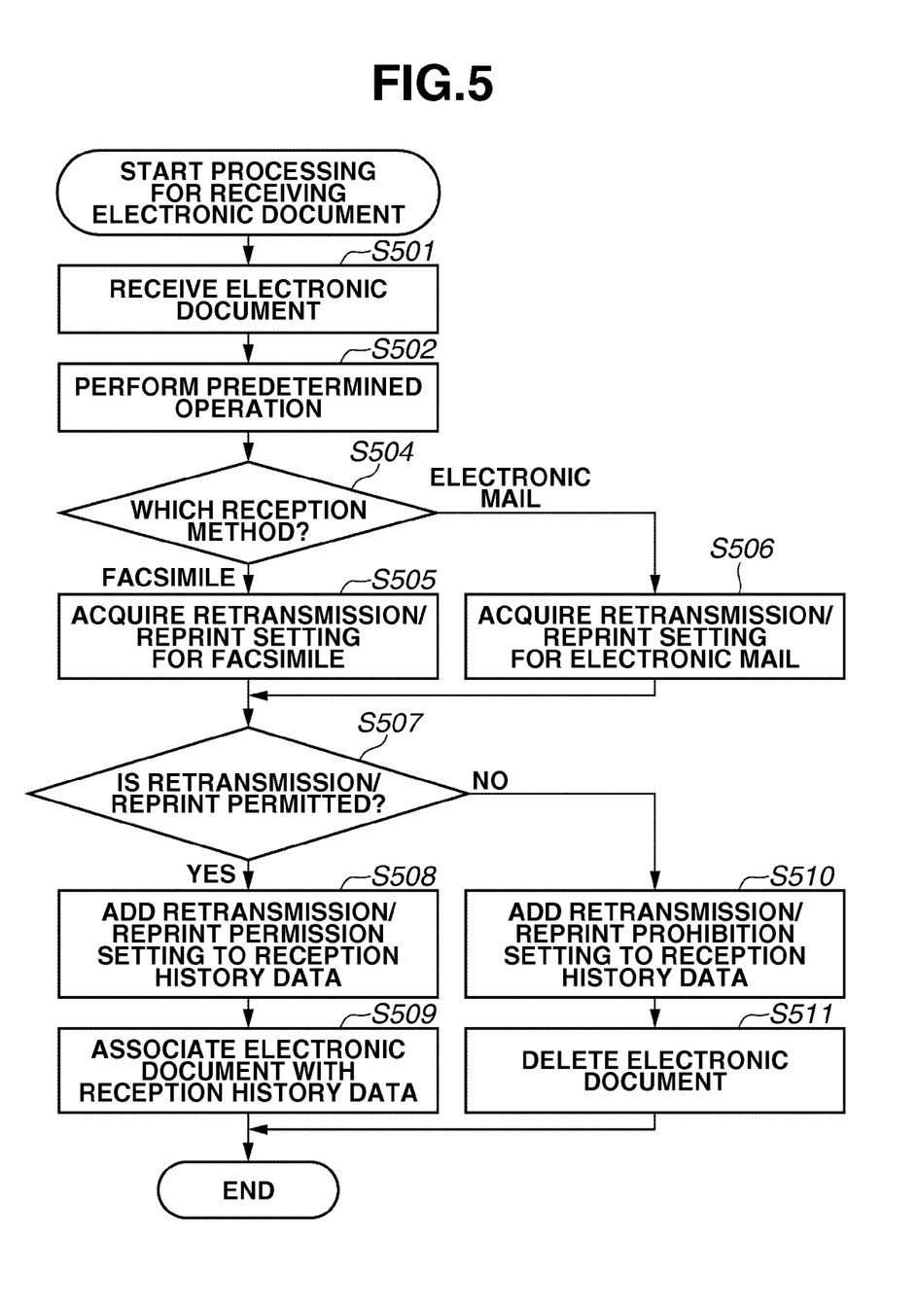
FIG. 5 is a flowchart illustrating processing for receiving an electronic document by the image processing apparatus according to the first embodiment.

FIG. 5 is a flowchart illustrating processing for receiving an electronic document by the image processing apparatus 101 illustrated in FIG. 3. A control program for realizing the respective steps in this flowchart is stored in the HDD 204. This program is read out to the RAM 202, and is executed by the CPU 201.

First, in step S501, the reception management unit 308 receives an electronic document by any one of a plurality of reception methods provided to the image processing apparatus 101, upon detecting occurrence of a job of receiving the electronic document. In step S502, the image processing apparatus 101 performs a predetermined operation on the electronic document.

For example, if the job detected in step S501 is a job of printing the electronic document, the image processing apparatus 101 prints an image based on the electronic document by the printer 295. On the other hand, if the job detected in step S501 is a job of transferring the electronic document, the image processing apparatus 101 transfers (transmits) the received electronic document via a transmission unit (for example, the network interface 210) after applying various types of processing to the electronic document as necessary.

After completion of the predetermined operation on the received electronic document, the reception management unit 308 stores reception history data in the history management unit 319. The reception history data includes, for example, a reception date and time of the electronic document, a transmission source of the electronic document, a type of the reception method (electronic mail or facsimile), and a reception result (OK or NG). Further, besides these pieces of data, the reception management unit 308 also stores the setting of the job, which is completed by execution of the predetermined operation, in the history management unit 319 as reception history data. When the user wants to reuse the electronic document based on the reception history data, the user can reuse the electronic document by utilizing the setting of the job included in the reception history data.

After completion of the predetermined operation on the received electronic document in step S502, in step S504, the reception management unit 308 determines which reception method was employed to receive the electronic document among the plurality of reception methods provided to the image processing apparatus 101.

If the electronic document was received by facsimile (FACSIMILE in step S504), the processing proceeds to step S505. In step S505, the reception management unit 308 acquires the RETRANSMISSION/REPRINT setting registered so as to correspond to the facsimile reception method. For example, in the setting screen illustrated in FIG. 4, RETRANSMISSION/REPRINT permission is set for the facsimile reception method, whereby the reception management unit 308 acquires the RETRANSMISSION/REPRINT permission setting (reuse permission setting).

On the other hand, if the electronic document was received by electronic mail (ELECTRONIC MAIL in step S504), the processing proceeds to step S506. In step S506, the reception management unit 308 acquires the RETRANSMISSION/REPRINT setting registered so as to correspond to the electronic mail reception method. For example, in the setting screen illustrated in FIG. 4, RETRANSMISSION/REPRINT prohibition is set for the electronic mail reception method, whereby the reception management unit 308 acquires the RETRANSMISSION/REPRINT prohibition setting.

Subsequently, in step S507, the reception management unit 308 determines whether RETRANSMISSION/REPRINT is permitted or prohibited based on the RETRANSMISSION/REPRINT setting acquired in step S505 or S506. If the reception management unit 308 determines that RETRANSMISSION/REPRINT is permitted (YES in step S507), the processing proceeds to step S508. In step S508, the reception management unit 308 adds the information of the RETRANSMISSION/REPRINT permission setting, which indicates that reuse is possible, to the reception history data stored in the history management unit 319 in step S502. This information indicates that the electronic document identified from the reception history can be reused (RETRANSMISSION/REPRINT is possible).

In step S509, the reception management unit 308 associates the electronic document received in step S501 and stored in the HDD 204 with the reception history data so that the electronic document can be referred to from the reception history data. Then, the processing of the present flowchart ends. The electronic document may be associated with other history data, instead of the reception history data. For example, if print processing is performed as the predetermined operation in step S502, the electronic document may be associated with the print history data. Further, if transfer processing is performed as the predetermined operation in step S502, the electronic document may be associated with the transfer history data.

On the other hand, if the reception management unit 308 determines in step S507 that RETRANSMISSION/REPRINT is prohibited (NO in step S507), the processing proceeds to step S510. In step S510, the reception management unit 308 adds the information of the RETRANSMISSION/REPRINT prohibition setting to the reception history data stored in the history management unit 319 in step S502. After that, in step S511, the reception management unit 308 deletes the received electronic document from the HDD 204. Then, the processing of the present flowchart ends.

According to the present embodiment, it is possible to switch the RETRANSMISSION/REPRINT setting between permission and prohibition according to which reception method is employed to receive an electronic document among the plurality of reception methods provided to the image processing apparatus 101. As a result, for example, it is possible to set the image processing apparatus 101 so as to prohibit reuse of electronic documents received by facsimile to prevent a leak of confidential information since an electronic document received by facsimile may contain confidential information from a client or a business partner, and at the same time, to permit limitless RETRANSMISSION/REPRINT of electronic documents received by electronic mail.

In the present embodiment, electronic documents permitted for RETRANSMISSION/REPRINT are stored in the HDD 204. However, electronic documents permitted for RETRANSMISSION/REPRINT may be stored in a storage device such as a Secure Digital (SD) card or a universal serial bus (USB) memory.

Further, in the present embodiment, the system is configured in such a manner that the setting screen illustrated in FIG. 4 is displayed on the operation unit 212, allowing the user to select the setting thereon to thereby register the reuse permission setting for electronic documents. Alternatively, the system may be configured in such a manner that the setting screen is displayed on an external apparatus in the network, instead of the operation unit 212, allowing the setting to be selected by an instruction issued from a remote location. In this case, selection of the setting on the external apparatus can be realized by transmitting the data of the setting screen illustrated in FIG. 4 to the external apparatus with use of, for example, HyperText Transfer Protocol (HTTP).

Next, a second embodiment will be described. The first embodiment has been described as an example in which the RETRANSMISSION/REPRINT setting is switched between permission and prohibition for an electronic document according to what type of reception method is employed to receive the electronic document. The second embodiment enables rules for permitting RETRANSMISSION/REPRINT of a received electronic document to be set in further detail.

The second embodiment is basically configured in a similar manner to the first embodiment illustrated in FIGS. 1, 2, and 3. Hereinafter, characteristic features of the second embodiment will be described.

Figure 6:
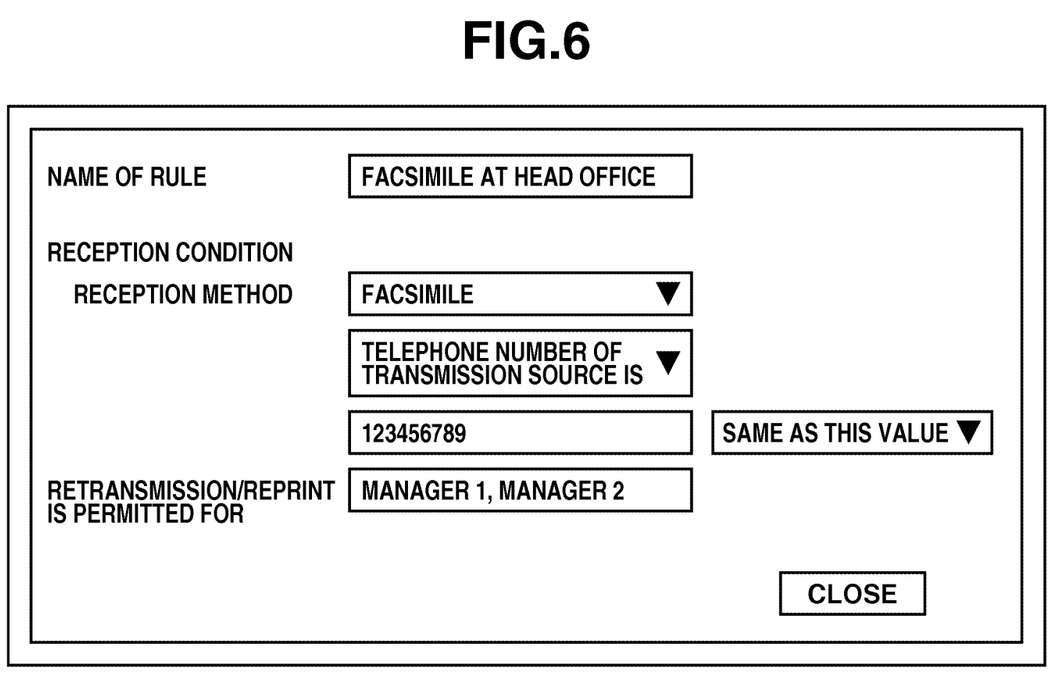
FIG. 6 is a setting screen where a user sets whether a received electronic document is stored for RETRANSMISSION/REPRINT for each reception method according to the first embodiment.

FIG. 6 illustrates an example of a setting screen where a user sets a reception condition and a person for which RETRANSMISSION/REPRINT is permitted when the image processing apparatus 101 according to the second embodiment receives an electronic document from an external apparatus, in such a manner that the setting corresponds to a reception method. The setting screen illustrated in FIG. 6 is displayed on the operation unit 212 of the image processing apparatus 101, as the screen illustrated in FIG. 4.

The screen illustrated in FIG. 6 sets such a condition that, if an electronic document is received by facsimile and the telephone number of the transmission source is the same as "123456789", "MANAGER 1" and "MANAGER 2" are permitted to perform RETRANSMISSION/REPRINT. In the screen illustrated in FIG. 6, facsimile is shown as a reception method by way of example. In a case where the image processing apparatus 101 includes a plurality of facsimile lines, the reusability may be set for each line such as a facsimile line 1 and a facsimile line 2.

Figure 7:
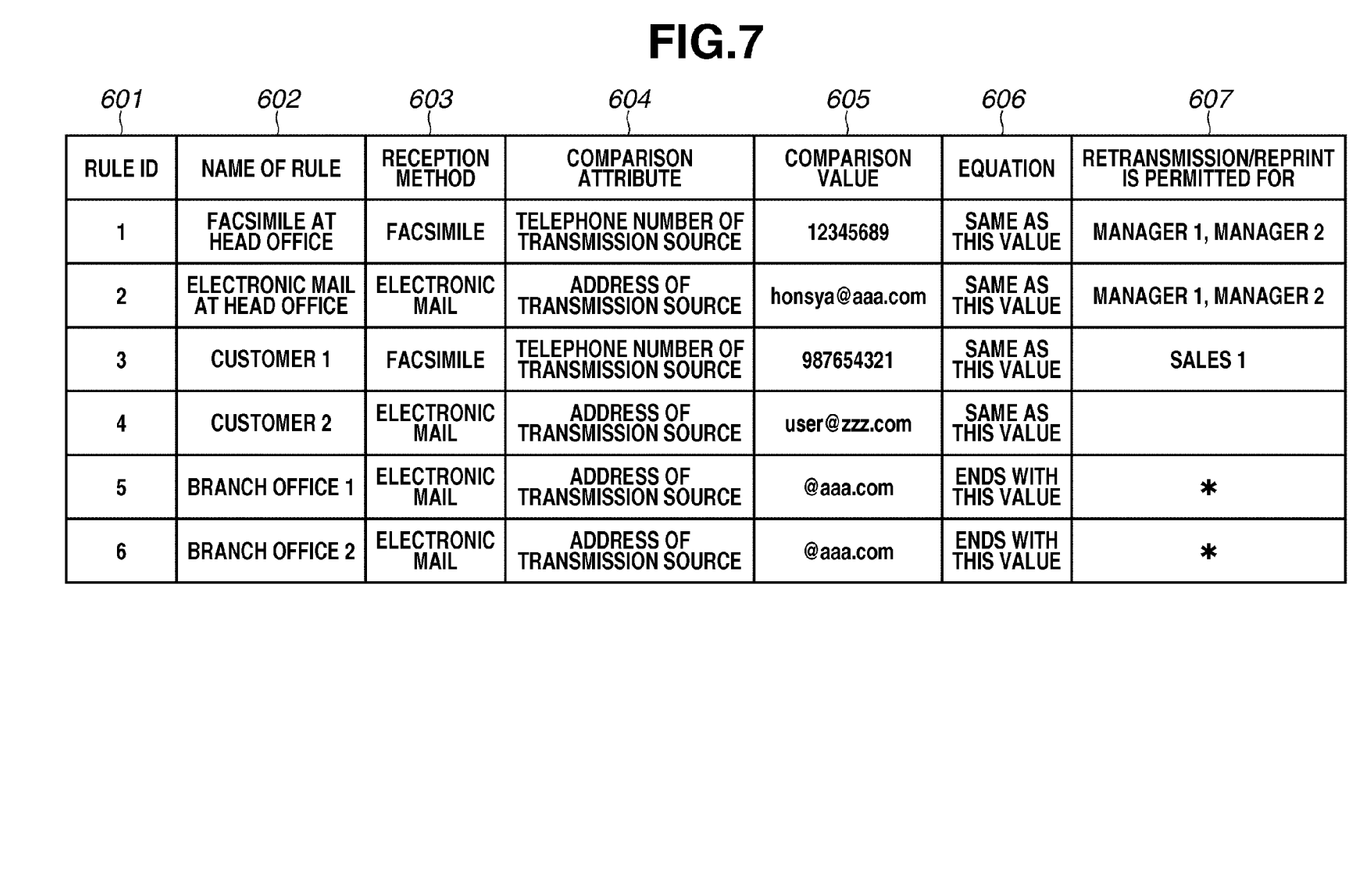
FIG. 7 illustrates an example of a data structure of reception rules registered with a reception rule registration unit.

FIG. 7 schematically illustrates a table for managing rules set via the setting screen illustrated in FIG. 6.

The table illustrated in FIG. 7 is an example of the data structure of reception rules registered with the reception rule registration unit 318 illustrated in FIG. 3. A rule identification (ID) 601 is an ID number uniquely assigned to each rule, and is used for internal management.

A name of rule 602 indicates an arbitrary name used by the user to identify the rule. A reception method 603 indicates which reception method is set as a comparison target, among the plurality of reception methods provided to the image processing apparatus 101, such as the I-FAX reception 313, the FAX reception 314, the FTP reception 315, and the E-mail reception 316.

A comparison attribute 604 indicates which attribute is set as a comparison target among various types of attributes such as the telephone number of a transmission source or the mail address of a transmission source included in an electronic document or information received together with the electronic document.

A comparison value 605 indicates a value to be compared for a reception job with respect to the attribute specified by the comparison attribute 604.

An equation 606 indicates how the value is compared, and the user selects a comparison method such as "SAME AS THIS VALUE", "ENDS WITH THIS VALUE", and "STARTS WITH THIS VALUE".

An item "RETRANSMISSION/REPRINT IS PERMITTED FOR" 607 indicates which user is permitted to perform RETRANSMISSION/REPRINT when the reception job satisfies the condition specified by the reception method 603, the comparison attribute 604, the comparison value 605, and the equation 606. The mark "*" set in this item indicates that all users are permitted to perform RETRANSMISSION/REPRINT. Another character string than the mark "*" set in this item indicates that the user specified by this character string is permitted to perform RETRANSMISSION/REPRINT. A blank cell for this item indicates that all users are prohibited to perform RETRANSMISSION/REPRINT.

Figure 8:
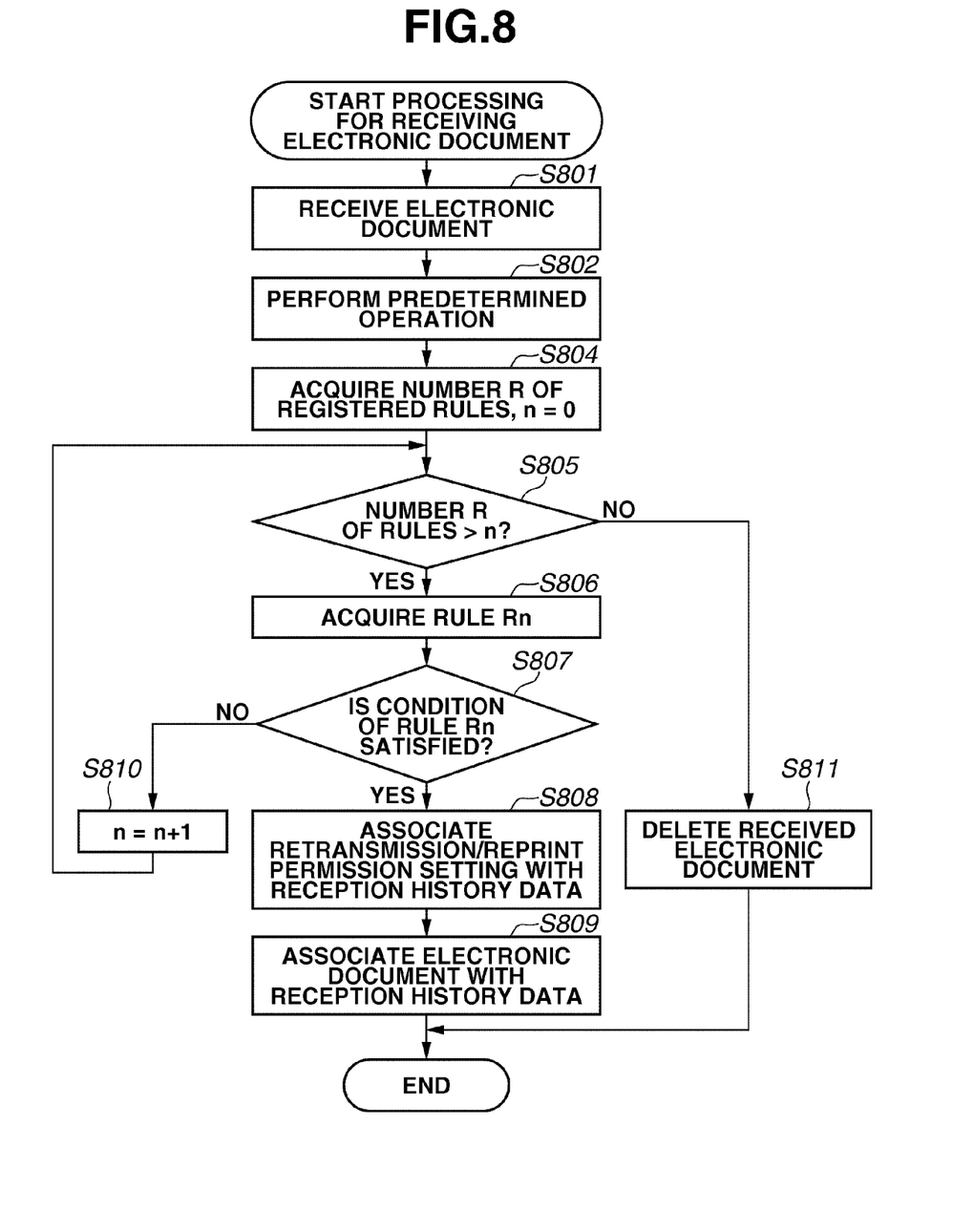
FIG. 8 is a flowchart illustrating processing for receiving an electronic document by the image processing apparatus according to a second embodiment of the present invention.

FIG. 8 is a flowchart illustrating processing for receiving an electronic document by the reception management unit 308 according to the second embodiment. A control program for realizing the respective steps in this flowchart is stored in the HDD 204. This program is read out to the RAM 202, and is executed by the CPU 201.

First, in step S801, the reception management unit 308 detects occurrence of a job of receiving an electronic document (a reception job). Then, in step S802, the image processing apparatus 101 performs a predetermined operation.

After completion of the predetermined operation, subsequently, in step S804, the reception management unit 308 acquires the number R of registered rules from the reception rule registration unit 318, and initializes a processing counter n to 0. In step S805, the reception management unit 308 determines whether the value of R is larger than the value of n. If the value of R is equal to or smaller than the value of n (NO in step S805), this means that the reception job does not meet the reception rules. In this case, the processing proceeds to step S811, in which the reception management unit 308 deletes the received electronic document. Then, the processing of the present flowchart ends.

On the other hand, if the reception management unit 308 determines in step S805 that the value of R is larger than the value of n (YES in step S805), the processing proceeds to step S806. In step S806, the reception management unit 308 acquires a rule Rn. Instep S807, the reception management unit 308 determines whether the information of the reception job satisfies the condition specified by the rule Rn. If the reception job does not satisfy the rule Rn (NO in step S807), the processing proceeds to step S810. In step S810, the reception management unit 308 increments the value of n. Then, the processing proceeds to step S805 again.

On the other hand, if the reception job satisfies the rule Rn (YES in step S807), the processing proceeds to step S808. In step S808, the reception management unit 308 adds the information of the RETRANSMISSION/REPRINT permission setting to the reception history data stored when the predetermined operation is performed in step S802. This added information of the RETRANSMISSION/REPRINT permission setting also includes the information of the user permitted to perform RETRANSMISSION/REPRINT.

In step S809, the reception management unit 308 associates the electronic document received in step S801 with the reception history data. Then, the processing of the present flowchart ends. The electronic document maybe associated with other history data, instead of the reception history data. For example, if print processing is performed as the predetermined operation in step S802, the electronic document may be associated with the print history data. Further, if transfer processing is performed as the predetermined operation in step S802, the electronic document may be associated with the transfer history data.

Figure 9:
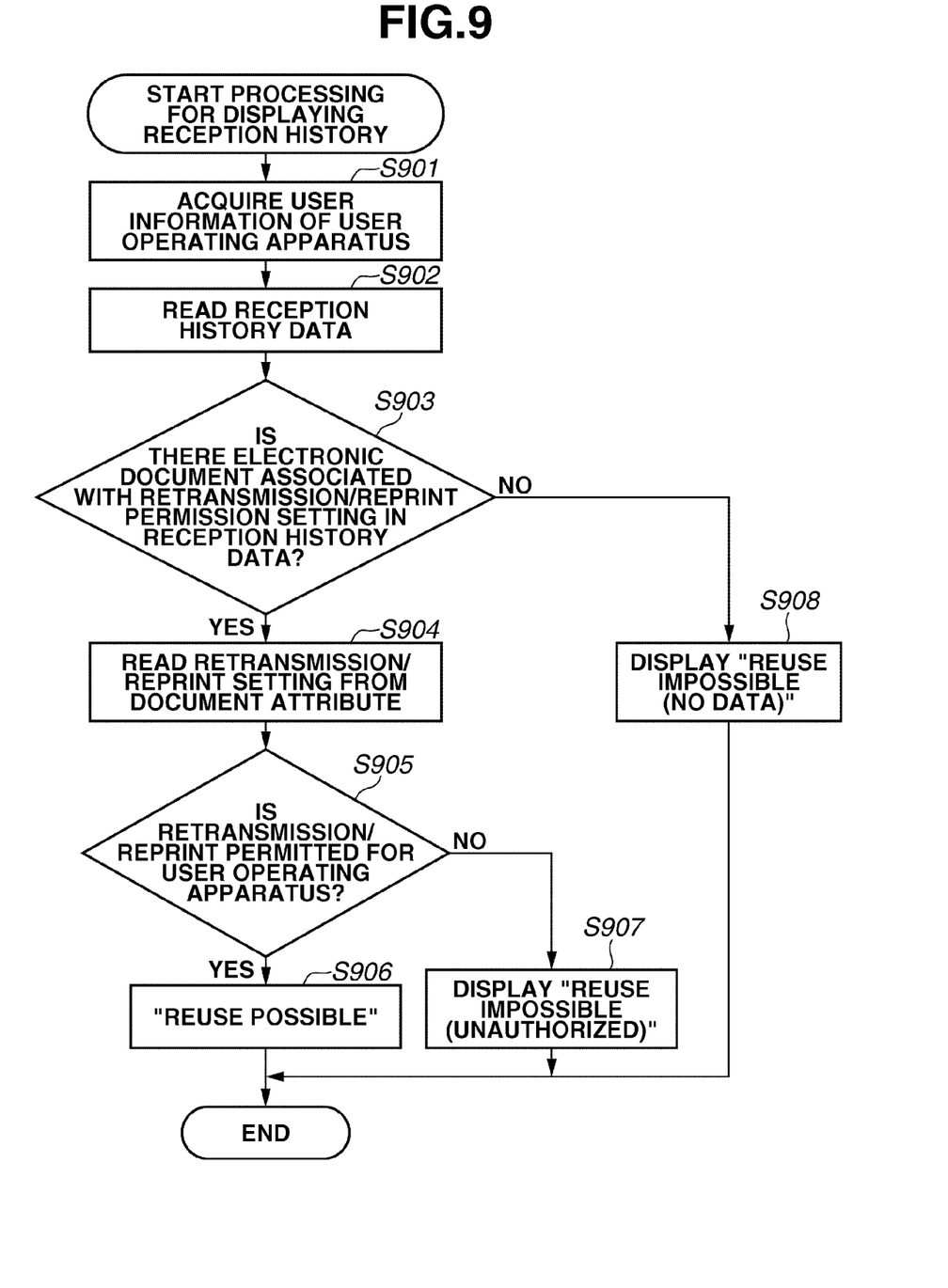
FIG. 9 is a flowchart illustrating processing for displaying a list of reception histories of electronic documents by the image processing apparatus according to the second embodiment.

FIG. 9 is a flowchart illustrating processing for displaying a list of reception job histories according to the second embodiment. A control program for realizing each step in this flowchart is stored in the HDD 204. This program is read out to the RAM 202, and is executed by the CPU 201.

In step S901, the history management unit 319 acquires user information (a user name and a password) of the user operating the image processing apparatus 101 with use of the operation unit 212. This user name is the character string that the user inputs with use of the operation unit 212.

Subsequently, in step S902, the history management unit 319 reads out reception history data. In step S903, the history management unit 319 determines whether any electronic document is associated with the reception history data for RETRANSMISSION/REPRINT.

If no electronic document is associated with the reception history data for RETRANSMISSION/REPRINT (NO in step S903), in step S908, the history management unit 319 displays "REUSE IMPOSSIBLE (NO DATA)" on the operation unit 212. Then, the processing of the present flowchart ends. If there is an electronic document associated with the reception history data for RETRANSMISSION/REPRINT (YES in step S903), the processing proceeds to step S904. In step S904, the history management unit 319 reads the RETRANSMISSION/REPRINT setting from a document attribute. Instep S905, the history management unit 319 determines whether the user information (the user name) acquired in step S901 is included in the RETRANSMISSION/REPRINT setting acquired in step S904. If the user information is included in the RETRANSMISSION/REPRINT setting (YES in step S905), the processing proceeds to step S906. Instep S906, the history management unit 319 displays "REUSE POSSIBLE" on the operation unit 212. If the user information is not included in the RETRANSMISSION/REPRINT setting (NO in step S905), instep S907, the history management unit 319 displays "REUSE IMPOSSIBLE (UNAUTHORIZED)" on the operation unit 212. Then, the processing of the present flowchart ends.

The above-described procedure from step S902 to step S908 is performed for one reception history. When there is a plurality of reception histories, this procedure is repeatedly performed, by which the list of reception history data is displayed as illustrated in FIG. 10, which will be described below.

In steps S907 and S908, the reception history data is displayed together with a character string indicating that the corresponding electronic document cannot be reused. Alternatively, the history management unit 319 may control the display in such a manner that the reception history data prohibited to be reused is not displayed on the operation unit 212 in the first place.

When the user selects the reception history data displayed together with the character string "REUSE POSSIBLE", and issues a print or transmission instruction, the user can print or transmit the electronic document identified from that reception history data, although this is not illustrated in the flowchart of FIG. 9. On the other hand, the reception history data displayed together with the character string "REUSE IMPOSSIBLE" is limited in such a manner that the user cannot issue a print or transmission instruction.

Figure 10:
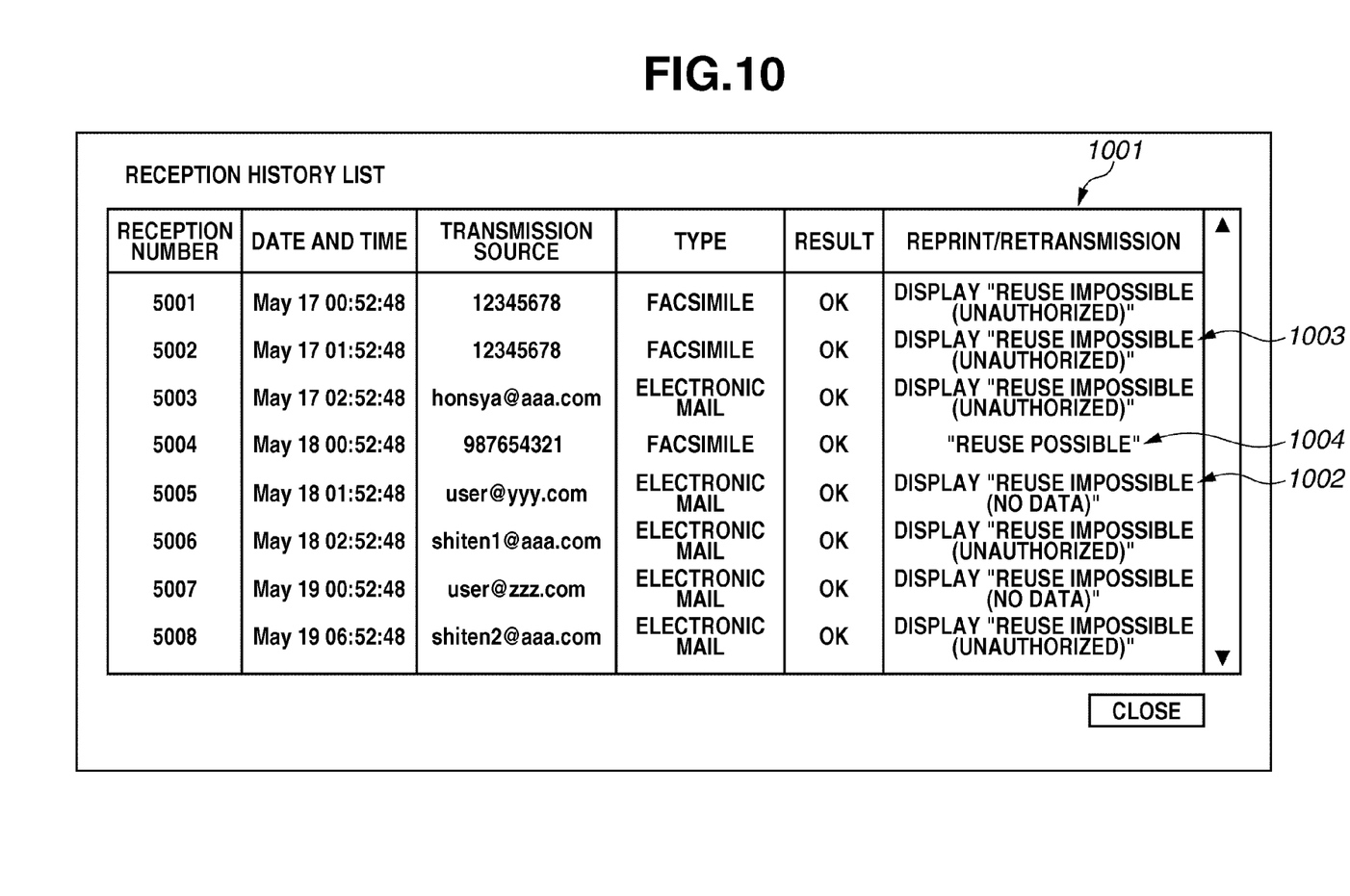
FIG. 10 illustrates an example of the reception history list displayed on an operation unit by a history management unit according to the second embodiment.

FIG. 10 illustrates an example of the reception history list that the image processing apparatus 101 according to the second embodiment displays on the operation unit 212.

The item relating to the RETRANSMISSION/REPRINT setting corresponding to each reception history data is displayed in a RETRANSMISSION/REPRINT column 1001.

A character string "REUSE IMPOSSIBLE (NO DATA)" 1002 indicates that no electronic document is associated with the reception history data of that record, i.e., no electronic document is stored in the HDD 204 for RETRANSMISSION/REPRINT.

A character string "REUSE IMPOSSIBLE (UNAUTHORIZED)" 1003 indicates that there is an electronic document associated with the reception history data of that record, but the user operating the image processing apparatus 101 cannot reuse the electronic document.

A character string "REUSE POSSIBLE" 1004 indicates that there is an electronic document associated with the reception history data of that record, and the user can reuse the electronic document.

In the example illustrated in FIG. 10, the item relating to the RETRANSMISSION/REPRINT setting is displayed when the reception history is displayed. However, the item relating to the RETRANSMISSION/REPRINT setting may be displayed in other manners. For example, if print processing is performed as the predetermined operation in step S802, the item relating to the RETRANSMISSION/REPRINT setting may be displayed when the print history is displayed. Further, if transfer processing is performed as the predetermined operation in step S802, the item relating to the RETRANSMISSION/REPRINT setting may be displayed when the transfer history is displayed.

In this way, according to the second embodiment, it is possible to switch the RETRANSMISSION/REPRINT setting for each reception information such as the telephone number of a transmission source. Further, it is possible to set permission or prohibition of reuse for each user that performs RETRANSMISSION/REPRINT, and therefore the system becomes further convenient.

The second embodiment is configured to display the setting screen illustrated in FIG. 6 on the operation unit 212 to allow the user to select the setting to register the reuse permission setting of an electronic document. However, the second embodiment may be configured to allow the user to select this setting not from the operation unit 212 but from an external apparatus in the network remotely.

Further, the first and second embodiments are configured to delete an electronic document from the HDD 204 after completion of a predetermined operation on the received electronic document as an example of prohibition of reuse of the electronic document (refer to step S511 in FIG. 5 and step S811 in FIG. 8). This configuration can prevent an electronic document prohibited to be reused from remaining recorded in the image processing apparatus 101.

However, as a modification example, the image processing apparatus 101 may be configured to just refrain from associating an electronic document with the reception history data without deleting the electronic document, thereby prohibiting reuse of the electronic document. According to this configuration, even an electronic document received by a reception method corresponding to the reuse prohibition setting remains stored in the HDD 204, in a similar manner to an electronic document received by a reception method corresponding to the reuse permission setting. However, due to the lack of an association between the reception history data of the electronic document and that electronic document, the electronic document cannot be referred to (identified) from the reception history data displayed when a user tries to reuse the electronic document. As a result, the electronic document is limited to be reused.

Further, as another modification example, the image processing apparatus 101 may be configured to, when (or after) a user selects the reception history data of an electronic document received by a reception method corresponding to the reuse prohibition setting and issues a reuse instruction, prohibit reuse of the electronic document. According to this configuration, regardless of whether a received electronic document is permitted or prohibited to be reused, the image processing apparatus 101 maintains the electronic document stored in the HDD 204 and associates the electronic document with the reception history data. In other words, in the first embodiment, if the determination results in NO in step S507, the processing proceeds to step S509 after step S510 in FIG. 5. In the second embodiment, if the determination results in NO in step S805, the processing proceeds to step S809 while skipping step S811 in FIG. 8. However, when the reception history illustrated in FIG. 10 is displayed, the electronic document with the reuse prohibition setting added thereto is displayed together with the "REUSE IMPOSSIBLE" indication. As a result, the electronic document is limited to be reused.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to embodiments, it is to be understood that the invention is not limited to the disclosed embodiments. The scope of the following claims is to be accorded the broadest interpretation so as to encompass all modifications, equivalent structures, and functions.

This application claims priority from Japanese Patent Application No. 2011-180585 filed Aug. 22, 2011, which is hereby incorporated by reference herein in its entirety.

What is claimed is:

1. An image processing apparatus capable of receiving an electronic document from an external apparatus according to a plurality of reception methods, the image processing apparatus comprising:
a processing unit configured to perform predetermined processing on the electronic document received from the external apparatus according to one of the plurality of reception methods;
a storage unit configured to store the received electronic document by associating the electronic document with a history of the predetermined processing performed by the processing unit;

a display unit configured to display the history of the predetermined processing performed by the processing unit;

a reuse unit configured to reuse the electronic document identified from the history displayed by the display unit;

a registration unit configured to register a reuse permission setting, which indicates permission of reuse of the electronic document, so as to correspond to at least one of the plurality of reception methods; and a control unit configured to permit the reuse unit to reuse the electronic document received according to the reception method that corresponds to the reuse permission setting, and to limit that the reuse unit reuses the electronic document received according to the reception method that does not correspond to the reuse permission setting.

2. The image processing apparatus according to claim 1, wherein the control unit controls the display unit not to display the history of the processing of the electronic document received according to the reception method that does not correspond to the reuse permission setting.

3. The image processing apparatus according to claim 1, wherein, when the display unit displays the history of the processing of the electronic document received according to the reception method that does not correspond to the reuse permission setting, the control unit prohibits the reuse unit from reusing the electronic document identified from the displayed history.

4. The image processing apparatus according to claim 1, wherein the reuse permission setting includes information indicating a user permitted to reuse the electronic document, and wherein the control unit permits the reuse of the electronic document, when a user selecting the history displayed by the display unit is the user indicated by the information included in the reuse permission setting.

5. An image processing apparatus capable of receiving an electronic document from an external apparatus according to a plurality of reception methods, the image processing apparatus comprising:

a registration unit configured to register a reuse permission setting, which indicates permission of reuse of the electronic document, so as to correspond to at least one of the plurality of reception methods;

a processing unit configured to perform predetermined processing on the electronic document received from the external apparatus according to one of the plurality of reception methods;

a storage unit configured to store the electronic document, which is received according to the reception method corresponding to the registered reuse permission setting, by associating the electronic document with a history of the predetermined processing performed by the processing unit;

a display unit configured to display the history of the predetermined processing performed by the processing unit; and a reuse unit configured to reuse the electronic document identified from the history displayed by the display unit.

6. A control method for an image processing apparatus capable of receiving an electronic document from an external apparatus according to a plurality of reception methods, the control method comprising:

registering a reuse permission setting, which indicates permission of reuse of the electronic document, so as to correspond to at least one of the plurality of reception methods;

performing predetermined processing on the electronic document received from the external apparatus according to one of the plurality of reception methods;

storing the electronic document, which is received according to the reception method corresponding to the registered reuse permission setting, by associating the electronic document with a history of the predetermined processing;

displaying the history of the predetermined processing; and reusing the electronic document identified from the displayed history.

7. A control method for an image processing apparatus capable of receiving an electronic document from an external apparatus according to a plurality of reception methods, the control method comprising:

performing predetermined processing on the electronic document received from the external apparatus according to one of the plurality of reception methods;

storing the received electronic document by associating the electronic document with a history of the performed predetermined processing;

displaying the history of the performed predetermined processing;

reusing the electronic document identified from the displayed history;

registering a reuse permission setting, which indicates permission of reuse of the electronic document, so as to correspond to at least one of the plurality of reception methods; and permitting the reuse of the electronic document received according to the reception method that corresponds to the reuse permission setting, and limiting the reuse of the electronic document received according to the reception method that does not correspond to the reuse permission setting.

8. An image processing apparatus capable of receiving data from an external apparatus according to a plurality of communication protocols, the image processing apparatus comprising:

a registration unit configured to register a reuse permission setting, which indicates permission of reuse, so as to correspond to at least one of the plurality of communication protocols;

a printing unit configured to print an image based on the data received from the external apparatus;

a storage unit configured to store the received data by associating the data with a history of the printing;

a display unit configured to display the history of the printing;

a reuse unit configured to reuse the data that is identified from the history displayed by the display unit; and a control unit configured to permit the reuse unit to reuse the data received according to the communication protocol that corresponds to the reuse permission setting, and to limit that the reuse unit reuses the data received according to the communication protocol that does not correspond to the reuse permission setting.

9. The image processing apparatus according to claim 8, wherein the control unit controls the display unit not to display the history of the printing of the data received according to the communication protocol that does not correspond to the reuse permission setting.

10. The image processing apparatus according to claim 8, wherein, when the display unit displays the history of the printing of the data received according to the communication protocol that does not correspond to the reuse permission setting, the control unit prohibits the reuse unit from reusing the data identified from the displayed history.

11. The image processing apparatus according to claim 8, wherein the reuse permission setting includes information indicating a user permitted to reuse the data, and wherein the control unit permits the reuse of the data, when a user selecting the history displayed by the display unit is the user indicated by the information included in the reuse permission setting.

12. The image processing apparatus according to claim 8, wherein the communication protocols include at least a facsimile communication protocol and a network communication protocol.

13. An image processing apparatus capable of receiving data from an external apparatus according to a plurality of communication protocols, the image processing apparatus comprising:

a registration unit configured to register a reuse permission setting, which indicates permission of reuse, so as to correspond to at least one of the plurality of communication protocols;

a printing unit configured to print an image based on the data received from the external apparatus according to one of the plurality of communication protocols;

a storage unit configured to store the data, which is received according to the communication protocol corresponding to the registered reuse permission setting, by associating the data with a history of the printing performed by the printing unit;

a display unit configured to display the history of the printing performed by the printing unit; and a reuse unit configured to reuse the data identified from the history displayed by the display unit.

* * * * *